(12) United States Patent
Bengtson et al.

(10) Patent No.: US 11,321,941 B2
(45) Date of Patent: May 3, 2022

(54) YIELD FORECASTING USING CROP SPECIFIC FEATURES AND GROWTH STAGES

(71) Applicant: Farmers Edge Inc., Winnipeg (CA)

(72) Inventors: Jacob Walker Bengtson, Houston, TX (US); Chad Richard Bryant, Calgary (CA); Changchi Xian, Calgary (CA); Charles Cuell, Kaslo (CA); Keilan Scholten, Lethbridge (CA); Fatema Tuz Zohra, Calgary (CA)

(73) Assignee: Farmers Edge Inc., Winnipeg (CA)

( * ) Notice: Subject to any disclaimer, the term of this patent is extended or adjusted under 35 U.S.C. 154(b) by 278 days.

(21) Appl. No.: 16/845,225

(22) Filed: Apr. 10, 2020

(65) Prior Publication Data

US 2020/0342226 A1   Oct. 29, 2020

Related U.S. Application Data

(60) Provisional application No. 62/837,334, filed on Apr. 23, 2019.

(51) Int. Cl.
*G06K 9/00* (2022.01)
*G06V 20/10* (2022.01)
(Continued)

(52) U.S. Cl.
CPC ......... *G06V 20/188* (2022.01); *G06K 9/6262* (2013.01); *G06N 3/0454* (2013.01); *G06N 3/08* (2013.01); *G06Q 10/04* (2013.01)

(58) Field of Classification Search
CPC .......... G06N 3/08; G06N 3/082; G06N 3/084; G06N 3/086; G06N 3/088; G06N 7/005; G06N 7/026; A01C 1/00; A01C 13/00; G06V 10/00; G06V 10/10; G06V 10/12; G06V 10/16; G06V 10/17; G06V 10/19; G06V 10/20; G06V 10/22; G06V 10/225; G06V 10/23; G06V 10/235; G06V 10/24; G06V 10/242; G06V 10/243;
(Continued)

(56) References Cited

U.S. PATENT DOCUMENTS 7,184,892 B1 *  2/2007  Dyer ................. G06Q 10/00
                                              702/5
9,880,140 B2 *  1/2018  Osborne ............ G01N 33/0098
(Continued)

*Primary Examiner* — Huy C Ho
(74) *Attorney, Agent, or Firm* — Ryan W. Dupuis; Kyle R. Satterthwaite; Ade & Company Inc.

(57) ABSTRACT

A method for predicting crop yield of an agricultural field may include steps of applying a pre-season model to provide a pre-season model crop yield prediction, applying an in-season model to provide an in-season model crop yield prediction, applying a statistical imagery model to provide a statistical imagery model crop yield prediction, applying a histogram-based image model to provide a histogram-based image model crop yield prediction, applying crop-specific models to provide at least one crop-specific model crop yield prediction, and combining at a computing system crop yield predictions from a plurality of models within a set comprising the pre-season model, the in-season model, the statistical imagery model, the histogram-based image model, and the crop-specific models, to produce a final crop yield prediction.

20 Claims, 9 Drawing Sheets

(51) Int. Cl.
*G06N 3/04* (2006.01)
*G06K 9/62* (2022.01)
*G06Q 10/04* (2012.01)
*G06N 3/08* (2006.01)

(58) Field of Classification Search
CPC .... G06V 10/245; G06V 10/248; G06V 10/25; G06V 10/255; G06V 10/26; G06V 10/28; G06V 10/267; G06V 10/273; G06V 10/44; G06V 10/443; G06V 10/446; G06V 10/451; G06V 10/457; G06V 10/50; G06V 10/507; G06V 10/52; G06V 10/56; G06V 10/54; G06V 10/58; G06V 10/60; G06V 10/62; G06V 10/70; G06V 10/72; G06V 10/74; G06V 10/75; G06V 10/755; G06V 10/82; G06V 10/96; G06V 10/94; G06V 10/98; G06V 20/68; G06V 20/698; A01D 91/02; A01D 91/00; A01D 91/04; A01D 93/00; G06T 1/0007
USPC ......................................................... 382/110
See application file for complete search history.

(56) References Cited

U.S. PATENT DOCUMENTS

2016/0247082 A1   8/2016  Stehling et al.
2018/0012168 A1*  1/2018  Hunt .................. G06Q 50/02
2019/0108631 A1   4/2019  Riley et al.

\* cited by examiner

YIELD FORECASTING USING CROP SPECIFIC FEATURES AND GROWTH STAGES

RELATED APPLICATIONS

This application claims priority to U.S. Provisional Patent Application No. 62/837,334, filed Apr. 23, 2019, entitled "YIELD FORECASTING USING CROP SPECIFIC FEATURES AND GROWTH STAGES", hereby incorporated by reference in its entirety.

TECHNICAL FIELD OF ART

This description relates to a method of predicting the average crop yield at the field level within the growing season using crop specific features. More specifically, this description relates to the use of remotely-sensed data and historical data aggregated with crop specific growth stages to predict the crop yield of an agricultural field.

BACKGROUND

Advances in the Internet of Things (IoT), ubiquitous connectivity, cheap storage, and cloud-computing power are making more data accessible for analysis. Precision agriculture is just one of the technical fields that is experiencing the advantages of these connectivity advances and access to cloud-based solutions. Benefits range from descriptive and prescriptive analytics, real-time alerting of field events (e.g., crop stages, equipment behavior, etc.), and optimization of operational processes, resulting in better practices that reduce input costs and maximize profit.

While the technology for observing data continues to improve, it is not always possible to measure a complete dataset, or with perfect accuracy, of crop yield, for example. Crop yield may be denoted in a variety of ways, some of which may include aggregate production values (e.g., bushels/acre across a field), spatial variations (i.e., relative yield differences between two zones in a field), and crop variations (e.g., yield associated with specific crop types in different zones). In regard to the ideal dataset, ultimately the yield would be a true two-dimensional (2D) yield surface over a particular area (i.e., yield as a function of x y coordinates), such as within a field boundary.

Remotely-sensed image data and products derived from that data (i.e., imagery products) are being increasingly utilized in agriculture. These data products can provide rapid and synoptic estimates of crop conditions over acres of agricultural fields. For example, an imagery product may estimate the crop conditions for a particular field using a combination of features and vegetation indices derived from the observed image's spectral data. By way of illustration, an imagery product may derive a Normalized Difference Vegetation Index (NDVI) from spectral data. It may be that an NDVI may demonstrate a high correlation between crop biomass and eventual yield, and thereby may provide information that assists the farmer to form a decision.

Determining a crop yield prediction for a particular agricultural field using remotely-sensed image data is useful information for growers. A grower might need to provide information to third parties and/or stakeholders associated with the field. Despite the utility offered by imagery products, a manual inspection of imagery products may require expertise and experience to properly interpret the data.

As such, a method to automatically determine the yield prediction for a crop of an agricultural field using a remotely sensed image is particularly desirable. However, imagery data cannot be solely relied on for predicting crop yield. A multitude of data and observations from the ground and satellites should be utilized to develop a more accurate estimate for the yield of a crop. A reliable crop yield prediction method incorporates a combination of historical observations, including observations of weather, imagery, and agronomy to derive models that were developed using machine learning techniques. Moreover, these models must be crop specific and include the different types of crops along with their respective growth stages. As an example, adequate moisture is needed at peak water usage (i.e., during flowering) of a crop; therefore, a heavy rainfall during a specific time can be beneficial for one type of crop, but not for another (e.g. soybean in southern Manitoba typically flowers mid-July, hence more rainfall in July translates to more beans). Another example of a crop specific factor may be temperature. For example, the temperature during flowering/pollination of a crop is important (e.g., above 85° F. for soybeans is too hot). Thus, despite various advancements, what is needed is a reliable crop yield prediction model.

SUMMARY

This method is used to predict the average crop yield of an agricultural field based on crop-specific growth stages. In one example, the method involves a prediction process for the field-level yield, where remotely-sensed data and historical data are aggregated by crop specific growth stages. Once the prediction for the crop yield is determined, it may be accessed by the grower or authorized third-party entities. Furthermore, this information may be sent to the grower or authorized third-party entities automatically or upon request.

According to one aspect, a method for predicting crop yield of an agricultural field includes steps of applying a pre-season model to provide a pre-season model crop yield prediction; applying an in-season model to provide an in-season model crop yield prediction; applying a statistical imagery model to provide a statistical imagery model crop yield prediction; applying a histogram-based image model to provide a histogram-based image model crop yield prediction; applying crop-specific models to provide at least one crop-specific model crop yield prediction; and combining at a computing system crop yield predictions from a plurality of models within a set comprising the pre-season model, the in-season model, the statistical imagery model, the histogram-based image model, and the crop-specific models to produce a final crop yield prediction.

According to another aspect, a computer-implemented method for predicting crop yield for a crop growing in an agricultural field is provided. The method includes applying a pre-season model to provide a pre-season model crop yield prediction to a computing system, wherein the pre-season model uses features selected from field and weather data acquired prior to planting of the crop as pre-season model parameters. The method further includes applying an in-season model to provide an in-season model crop yield prediction to the computing system using features selected from field and weather data acquired after planting of the crop as in-season model parameters. The method further includes applying a statistical imagery model to provide a statistical imagery model crop yield prediction to the computing system using features selected from statistical image values computed from remotely sensed image data. The method further includes applying a histogram-based image model to provide a histogram-based image model crop yield prediction to the computing system, the histogram-based image model configured to use remotely sensed image data. The method further includes applying at least one crop-specific model to provide a at least one crop-specific model crop yield prediction to the computing system using crop-specific information, weather data, and soil characteristics. The method further includes combining at the computing system a plurality of yield predictions from a set comprising the pre-season model crop yield prediction, the in-season model crop yield prediction, the statistical imagery model crop yield prediction, the histogram-based image model crop yield prediction, and the at least one crop specific model prediction to generate a final crop yield prediction. The combining may be performed by ensembling the plurality of yield predictions to generate the final crop yield prediction. The combining may be performed by stacking the plurality of yield predictions to generate the final crop yield prediction. At least one of the pre-season model, the in-season model, the statistical imagery model, the histogram-based image model, and the at least one crop specific model may use a convolutional neural network, or a multi-layer predictor. The combining may be performed at the computing system using a final crop yield prediction model. The method may further include communicating the final crop yield prediction to a data management platform configured to communicate the final crop yield prediction to a device associated with a user. The plurality of yield predictions may include each of the pre-season model crop yield prediction, the in-season model crop yield prediction, the statistical imagery model crop yield prediction, the histogram-based image model crop yield prediction, and the at least one crop-specific model crop yield prediction. The plurality of yield predictions may instead include 9. The method of claim 1 wherein the plurality of yield predictions include at least one non-image based model prediction and at least one image based model prediction.

According to another aspect, an apparatus includes a computing system having at least one processor and at least one memory operatively coupled to the at least one processor. The memory storing instructions to perform steps to: apply a pre-season model to provide a pre-season model crop yield prediction, wherein the pre-season model uses features selected from field and weather data acquired prior to planting of the crop as pre-season model parameters; apply an in-season model to provide an in-season model crop yield prediction using features selected from field and weather data acquired after planting of the crop as in-season model parameters; apply a statistical imagery model to provide a statistical imagery model crop yield prediction using features selected from statistical image values computed from remotely sensed image data; apply a histogram-based image model to provide a histogram-based image model crop yield prediction, the histogram-based image model configured to use remotely sensed image data; apply at least one crop-specific model to provide a at least one crop-specific model crop yield prediction using crop-specific information, weather data, and soil characteristics; and combine a plurality of yield predictions from a set comprising the pre-season model crop yield prediction, the in-season model crop yield prediction, the statistical imagery model crop yield prediction, the histogram-based image model crop yield prediction, and the at least one crop specific model prediction to generate a final crop yield prediction. In order to combine the plurality of yield predictions, the plurality of yield predictions may be ensembled or stacked. One or more of the crop models may use a convolutional neural network or a multi-layer predictor. To combine the plurality of yield predictions a final crop yield prediction model may be used. The method may further include communicating the final crop yield prediction to a data management platform configured to communicate the final crop yield prediction to a device associated with a user. The plurality of yield predictions may include the pre-season model crop yield prediction, the in-season model crop yield prediction, the statistical imagery model crop yield prediction, the histogram-based image model crop yield prediction, and the at least one crop-specific model crop yield prediction.

According to another aspect, a computer-implemented method for predicting crop yield for a crop growing in an agricultural field is provided. The method includes combining at a computing system applying a final crop yield prediction model using a plurality of yield predictions, wherein the plurality of yield predictions include (1) at least one non-image based model selected from a first subset comprising a pre-season model crop yield prediction, an in-season crop yield prediction, and at least one crop-specific model crop yield prediction, and (2) at least one image based model selected from a second subset comprising a statistical imagery model crop yield prediction and a histogram-based image model crop yield prediction. The pre-season model provides a pre-season model crop yield prediction to a computing system, wherein the pre-season model uses features selected from field and weather data acquired prior to planting of the crop as pre-season model parameters. The in-season model provides an in-season model crop yield prediction to the computing system using features selected from field and weather data acquired after planting of the crop as in-season model parameters. The statistical imagery model provides a statistical imagery model crop yield prediction to the computing system using features selected from statistical image values computed from remotely sensed image data. The histogram-based image model provides a histogram-based image model crop yield prediction to the computing system, the histogram-based image model configured to use remotely sensed image data. The crop-specific model provide at least one crop-specific model crop yield prediction to the computing system using crop-specific information, weather data, and soil characteristics. The method may further include communicating the final crop yield prediction to a data management platform configured to communicate the final crop yield prediction to a device associated with a user. The combining may be performed using at least one of ensembling and stacking.

BRIEF DESCRIPTION OF DRAWINGS

The details of the present invention as a method may be garnered in part by study of the accompanying drawings, in which the figures are referred to in numerals and are as follows.

DETAILED DESCRIPTION

I. Overview

Figure 2:
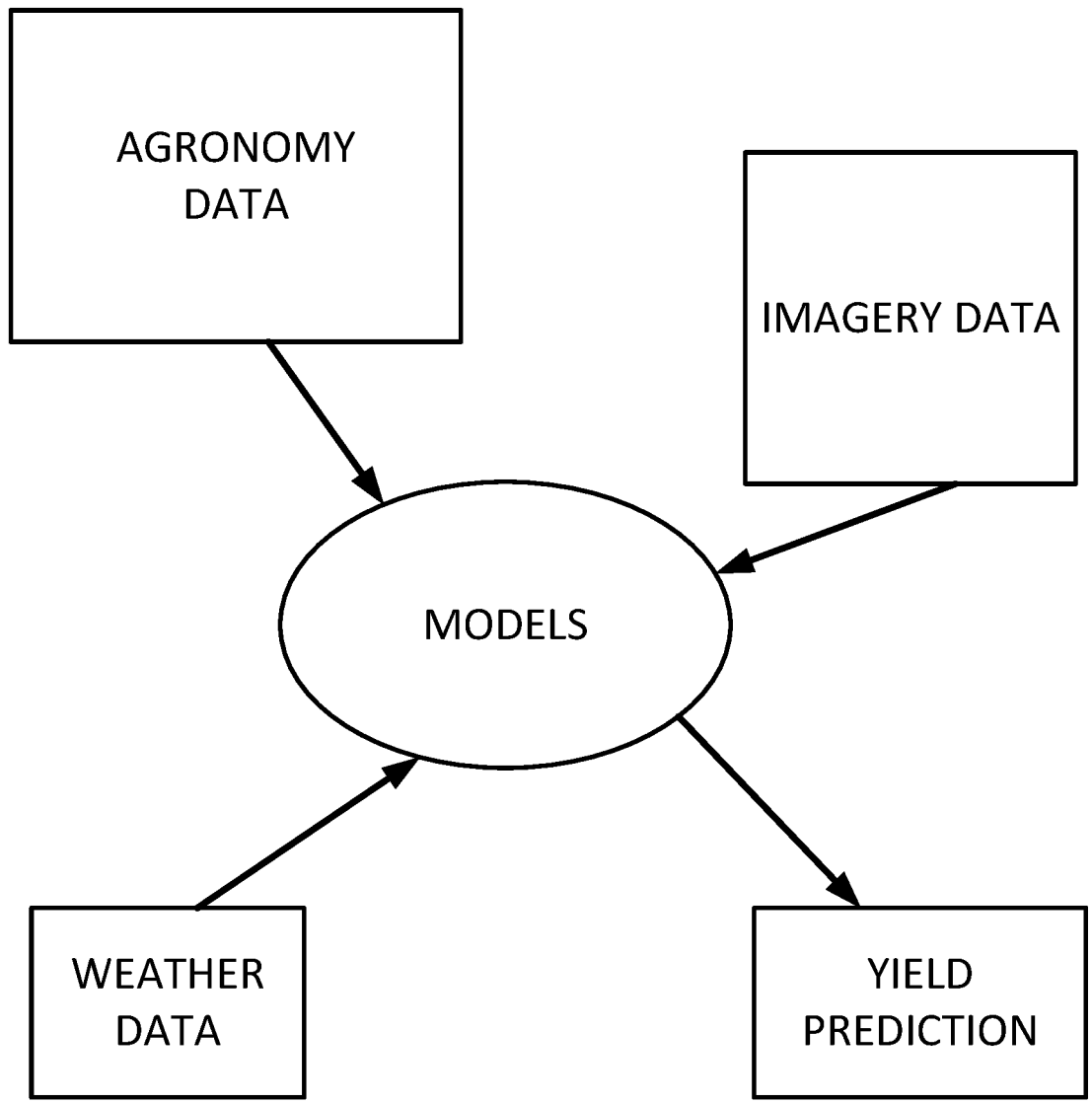
FIG. 2 illustrates a generalized overview of the yield forecasting method.

An overview of the yield forecasting method is illustrated in FIG. 2. Historical and real-time data of weather, imagery, and agronomy are utilized to derive models developed using various machine learning techniques. The yield predictions are made at field level for any type of crop.

Through the use of machine learning models, a multitude of data and observations from the ground and satellites are taken to generate an estimate for the yield of a crop. Estimates are based on five types of models: (1) Pre-season, (2) In-season, (3) Statistical image-based, (4) Histogram image-based, and (5) Crop Specific models, or combination thereof. The yield predictions from these models are ensembled or stacked together to create an estimated yield based on all the models together to eliminate as much bias and overfitting as possible.

The five types of models used in determining the yield for any field may be summarized as follows:

(1) Pre-season model—this model encompasses using only data gathered previous to the planting of the field. It also uses the location of the field in latitude and longitude and the crop that is to be planted.

(2) In-season model—this model encompasses data gathered at and after planting, including any weather and applied fertilizer components.

(3) Statistical Imagery Model—this model uses satellite spectral bands. Statistical information is gathered for each field starting at planting from any number of satellites including: PlanetScope™, RapidEye™, and LandSat8™.

(4) Histogram-based image Model—this model converts the images into histograms containing pixel information and then stacks them into a time-channel from imagery provided from any number of satellites including: PlanetScope™, RapidEye™, and LandSat8™. The model is developed on this temporal information.

(5) Crop-specific Models—these models use features derived from the growth stages of the plants after seeding. These features include weather during growth stages, soil conditions, and crop information. The crop specific model is not limited to only one crop model, and it may include a number of crop specific models.

Figure 3:
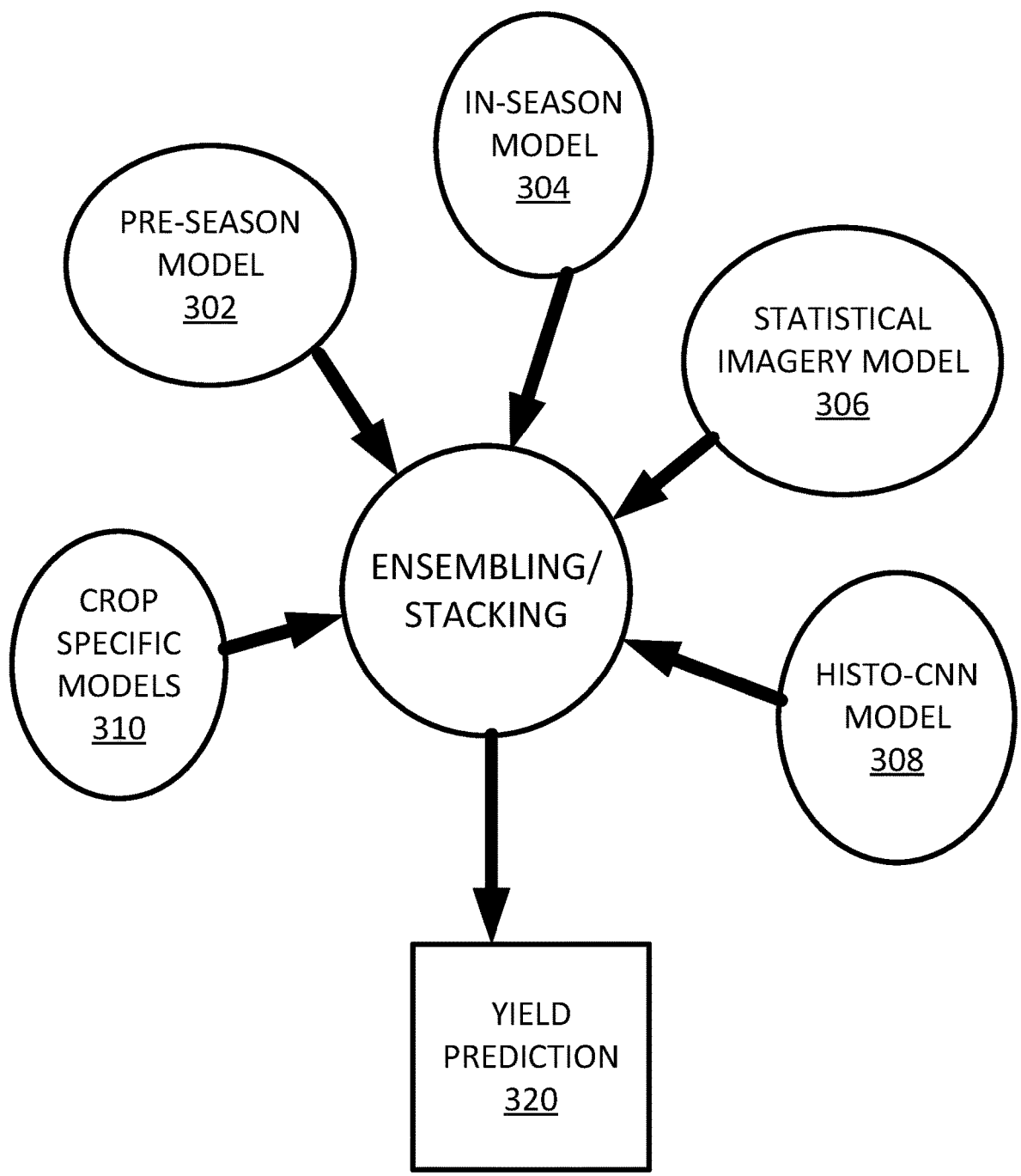
FIG. 3 illustrates an overview of the final yield forecasting model used by the yield forecasting method.

Once each model has provided a prediction for the field yield, some or all the predictions will be ensembled or stacked together to make a final prediction. This methodology is used in machine learning to correct overfitting and bias in a single model. Ensembling may produce a simple average mean of all the predictions, for example, while stacking uses the results of the yield predictions as features into a new model as a "second layer" prediction. FIG. 3 illustrates an overview of the final yield forecasting model 300 used by the yield forecasting method. In particular, a pre-season model 302, an in-season model 304, a statistical imagery model 306, a histogram-based image model 308, and one or more crop specific models 310 are shown, which may be combined through step 312 of ensembling or stacking to produce a final yield prediction 320.

Once the crop yield prediction has been determined, this information may be sent to growers or third-party entities in the form of a notification. The generated crop yield prediction can be handed off to a separate data management platform where it is issued to the user. A detailed description of the processes and algorithms utilized in this system is as follows below and includes specific examples of possible implementation.

II. General Description (a) Structural Overview

Figure 1:
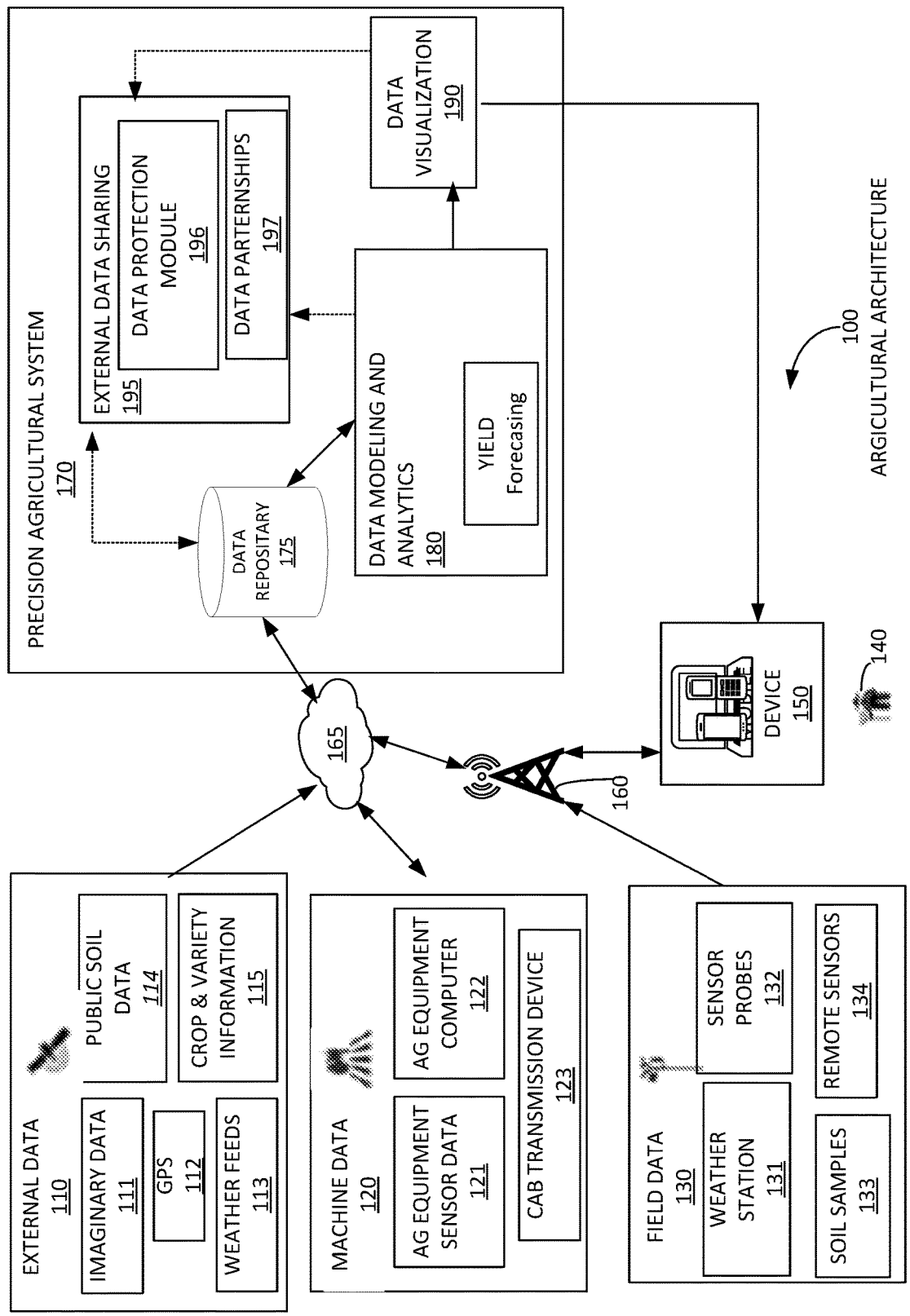
FIG. 1 illustrates an example precision agricultural system that is configured to perform the yield forecasting method in an agricultural architecture.

FIG. 1 illustrates an example precision agricultural system 170 that is configured to perform the yield forecasting method in an agricultural architecture 100. The agricultural architecture 100 is configured to perform functions described in the following and includes user 140, external data 110, machine data 120, field data 130, a mobile device 150, a communication link 160, network 165, and precision agricultural system 170. The precision agricultural system 170 includes the data repository 175, data modeling and analytics 180, data visualization 190, and external data sharing 195.

The mobile device 150, external data 110, machine data 120, field data 130, data repository 175, data modeling and analytics 180, data visualization 190, and external data sharing 195 include computing devices that may be physically remote from each other, but which are communicatively coupled by the network 165. The machine data 120, field data 130, and mobile device 150 are connected through the communication link 160.

Agricultural machines enable a user 140 (e.g., farmer and/or farming business) to plant, harvest, treat, observe, and otherwise manage crops. The precision agricultural system 170 captures, stores and shares farming operation data generated through external data 110, machine data 120, field data 130, and data generated by user 140. Examples of farming operation data include seeding, fertilizer application, spraying, harvesting, tillage, input supplies, labour costs, hours, service records, production histories, crop condition, and task management. Farming operation data is compiled in various ways according to field, zone, etc.

Embodiments of the current description describe the agricultural architecture 100. One embodiment provides methods for a cab transmission device 123 to collect, store, interpret, and transmit data associated with farming operations at a farming business. The agricultural architecture 100 is shown with an apparatus, which may interoperate. In one embodiment, the user 140 operates a mobile device 150 in a field location. The mobile device 150 provides field data 130 to the precision agricultural system 170 via communication links 160 and networks 165. The communication link 160 is typically a cell tower but can be a mesh network or power line. The network 165 is typically the Internet but can be any network(s) including but not limited to a LAN, a MAN, a WAN, a mobile wired or wireless network, a private network, a virtual private network, or a combination thereof.

Examples of external data 110 include: imagery data 111, global positioning system (GPS) data 112, weather feeds 113, public soil data 114, and crop and variety information 115. Imagery data 111 includes data from satellite images (e.g., PlanetScope™, RapidEye™, PlanetScope Mission 2™, SkySat™, LandSat™ 7, 8, and Sentinel™), unmanned aerial vehicles (e.g., Green Arrow), aircraft imagery, cameras, computers, laptops, smartphones, tablets, personal digital assistants (PDAs), or any other device with a cellular connection. GPS data 112 includes, for example, the current number of satellites receiving data, current location, heading, current speed, time stamp, latitude, longitude, and altitude. Weather feeds 113 include, for example, Iowa State Soil Moisture Network and The Weather Company (IBM). An example of public soil data 114 is the Soil Survey Geographic Database (SSURGO). An example of crop and variety information 115 is the Crop Data Management System (CDMS).

Some examples of machine data 120 include agricultural equipment sensor data 121 (e.g., from sensors located on the machine, equipment and/or implements), data from agricultural equipment computers 122 (these computers may be provided by the agricultural equipment manufacturer or a third-party company, for example Trimble™ or TopCon™), and from a cab transmission device 123, such as CanPlug™, available from Farmers Edge Inc., Winnipeg, Manitoba, Canada. Both the agricultural equipment sensor data and the agricultural equipment computer data may feed into the cab transmission device 123 and then into the communication link 160.

Field data 130 can be data acquired from (a) weather stations 131 (data can include, for example: precipitation, daily and hourly precipitation, temperature, wind gust, wind speed, pressure, clouds, dew point, delta T (change in temperature), Grassland Fire Danger Index (GFDI), relative humidity, historical weather, forecast, wind direction, barometric pressure, growing degree days, humidity), (b) sensor probes 132 (for example: a soil moisture probe that provides near-real-time data on volumetric soil moisture content, which gets converted into a percent of available water within the crop rooting zone, inches of available water, crop root dynamics, and irrigation requirements; the probe also measures soil temperature at various depths), (c) soil samples 133 (data can include, for example: elemental composition, pH, organic matter, cation exchange capacity, percent base saturation, excess lime, soluble salts), and (d) remote sensors 134 (for example: sensors on farm structures, drones, and robots).

External data 110, machine data 120, field data 130, and mobile device 150 are communicatively coupled and programmed to send data to other parts of the precision agricultural system 170 via the communication link 160 and network 165. These various sources of data, 110, 120, 130, and 150 may be owned by the same legal entity as the precision agricultural system 170 or by a different entity such as a government agency or private data service provider. Machine data 120 is bidirectionally communicatively coupled to the network 165 and can receive input via the communication link 160.

Ag equipment sensor data 121 is generated by one or more remote sensors affixed to agricultural machines and implements. These sensors are communicatively coupled to the ag equipment computer 122 and the cab transmission device 123. Examples of agricultural machines with sensors include tractors, planters, and combine harvesters, as well as machines not necessarily associated with farming operations such as flying (e.g., remote-operated drones). In practice, the agricultural machine may be coupled to one or more implements with remote sensors, which provide ag equipment sensor data 121.

Implements are any agricultural machinery used on a farm to aid and/or assist in farming, and examples include sprayers, plows, and cultivators. The agricultural machine is coupled to the implement(s) via a vehicle bus. The vehicle bus can operate according to the Society of Automotive Engineers (SAE) J1939. SAE J1939 is used for communication and diagnostics among the implement and the agricultural machine. The vehicle bus may be, more specifically, a controller area network (CAN) bus. The CAN bus may operate according to International Organization for Standardization (ISO) 11783 known as "Tractors and machinery for agriculture and forestry—Serial control and communications data network." ISO 11783 is a communication protocol commonly used in the agriculture industry and is based on SAE J1939. However, in other embodiments, the vehicle bus may use an alternative data exchange mechanism, such as Ethernet wiring and a network transmission protocol such as TCP/IP.

The agricultural machine may be communicatively coupled to a cab transmission device 123 via a CAN bus or other bus. The cab transmission device 123 is configured to translate vehicle bus messages and convert them for interpretation by the mobile device 150 and furthermore for data modeling and analytics 180. The cab transmission device 123 is further communicatively coupled to the mobile device 150. The purpose of the cab transmission device 123 is to transmit information, such as farming operation data generated by farming vehicles, (e.g., tractors), and farming implements, (for example, planters), to the precision agricultural system 170. In some configurations, either the agricultural equipment sensor data 121 or the cab transmission device 123 may be communicatively coupled directly to the mobile device 150 via a communication link 160 or the data repository 175 through the network 165. For example, either an implement or a machine may include a wireless communication device allowing communications through the network 165.

The mobile device 150 allows the user 140 to interface with data received from the cab transmission device 123. The mobile device allows users 140 to access and interact with data stored on the data repository 175. The data repository 175 processes data received from the mobile device 150 together with information received from the external data sources 110, machine data 120, and field data 130.

The data repository 175 stores raw data received through the network 165 from external data 110, machine data 120, field data 130, mobile device 150, and other parts of the precision agricultural system 170. Raw data may be received from an external data sharing 195, which allows the data repository 175 to be configured to receive input from authorized data partnerships 197 using the data protection module 196. Data protection module 196 ensures that the users or devices are authorized to receive reports on the requested data.

As data is collected into the data repository 175, it is processed to derive values from data that can drive many functions such as visualization, reports, decision-making, and other analytics. Functions created may be shared and/or distributed to authorized users and subscribers. The processing of data occurs in the data modeling and analytics 180, with the resulting processed data pushed down to authorized users or subscribers, for example, in the form of a custom report. Some authorized users or devices may be granted authorization to only view the data stored within the data repository 175 of the precision agricultural system 170, and not the authority to make changes. Other authorized users or devices may be given authorization to both view/receive data from and transmit data into the data repository 175.

Data modeling and analytics 180 may be programmed or configured to manage read operations and write operations involving the data repository 175 and other functional elements of the precision agricultural system 170, including queries and result sets communicated between the functional elements of the precision agricultural system 170 and the data repository 175. Models within the data repository 175, may consist of electronic digitally stored executable instructions and data values associated with one another. These models can receive and respond to digital calls to yield output values for computer-implemented recommendations generated by data modeling and analytics 180.

Data visualization 190 may be programmed or configured to generate a graphical user interface (GUI) to display on the precision agricultural system 170, mobile device 150, or to data partnerships 197 via external data sharing 195. The GUI may comprise controls for inputting data to be sent to the precision agricultural system 170, generating requests for modeling and/or recommendations.

(b) Application Program Overview

In an embodiment, the descriptions of processes and functions, which use one or more computer programs or software elements, may serve as plans or directions to a skilled person to implement the functions described herein. FIG. 1 and the text are intended to demonstrate the method used to provide disclosure of plans and directions.

In an embodiment, user 140 interrelates with the precision agricultural system 170 using mobile device 150, organized with an operating system or one or more application programs/systems. An example of an application program used by mobile device 150 is FarmCommand™, which is commercially available from Farmers Edge Inc., Winnipeg, Alberta, Canada. FarmCommand™ features computer software platforms for cloud-based services in the field of agriculture, namely, software for data collection, processing, reporting and analysis, communication and transmission software; software for data collection, processing, reporting and analysis of agricultural information and data, farm and field production process management software, land assessment software, crop monitoring software, crop yield and moisture mapping and analysis software, crop fertility review and planning software, agronomic modeling software, software for data management in the field of agriculture, software for geospatial content management, and software for agriculture management relating to farming and farming planning.

The mobile device 150 may be, for example, a smartphone, tablet, laptop, desktop, or other computing device capable of transmitting and receiving information. The mobile device 150 may communicate directly to the cab transmission device 123 via communication link 160 using a mobile application stored on the mobile device 150. For example, the application program running on the precision farming system 170 may receive machine data 120 through the cab transmission device 123 sending it to the data repository 175. The application may provide serviceability for user 140 via the network 165. For example, the mobile device 150 may access the application through a web browser or an application and may transmit data to and from the precision agricultural system 170.

In an embodiment, external data 110, machine data 120, and field data 130 are sent to the precision agricultural system 170 via the network 165. The collected data may comprise values representing field locations, soils, weather, agricultural equipment, imagery, sensors, and crop variety information. The application may send data in response to user 140 input or data may be sent automatically when values becomes available to the application.

A data repository 175 may store raw data received by the precision agricultural system 170. Raw data may be received from several sources such as an external data 110 provider, machine data 120, field data 130, mobile device 150, and external data sharing 195. All the data sources 110, 120, 130, 150, and 195 can be transmitted to/or alternatively, from the data repository 175. Authorized data partnerships 197 may also access specific data in the data repository 175.

In some embodiments, for example, field map data layers, health alert instructions, variable-rate fertility prescriptions, machine alerts, and weather data and forecasts, are stored in the data repository 175 and are programmed with tools for data visualization 190 available to growers. This information enables growers to make informed operational decisions in real-time.

(c) Data Acquisition

One type of the data ingested into the precision agricultural system 170 may be external data 110. The external data 110 may be derived from several different third-party sources, which may be stored on different external servers. In an embodiment, data representing imagery 111, GPS 112, weather feeds 113, public soil data 114, and crop and variety information 115 are included as external data 110. Imagery data 111 may consist of an image or photograph taken from a remote sensing platform (airplane, satellite, or drone), or imagery as a raster data set, each raster being comprised of pixels. Each pixel has a specific pixel value (or values) that represents a ground characteristic. Global Positioning System (GPS) data 112 may consist of coordinates and time signals gathered from space-based satellites to help track assets or entities. Examples of assets or entities include grower devices, agricultural equipment, vehicles, drones, smart sensors etc. Weather feeds 113 could be provided, for example, by establishing interfaces with established weather data providers, such as NOAA. Public soil data 114 is acquired from public soil databases, such as SSURGO which provide access to soil sampling data, including chemistry records for various types of soil. This information may be collected and managed by states, counties, and/or farmers. Crop and variety information 115 may be retrieved from a seed variety database. There are several different chemical companies that provide hybrid seeds and the genetic engineering services. As required by governance, every bag of seed is required to have a seed variety number on it, the precision agricultural system of the present description will use this interface to track seed variety numbers for the seed varieties that is being used for farming operations.

External data 110 may be acquired from many different publicly available sources and/or databases, which are known to a person skilled in the technical field. The precision agriculture system may be configured to establish an electronic connection with and retrieve the external data from these publicly available sources or databases. For example, some states require registration and documentation of certain data associated with the land. The precision agriculture system may also include one or more interfaces to one or more state- or county-operated registration databases, which will provide this specific data.

Another type of data ingested into the precision agricultural system 170 may include machine data 120. The machine data 120 may be derived from agricultural equipment sensor data 121, agricultural equipment computer 122, or cab transmission device 123. Agricultural equipment sensor data 121 provides data that is derived from sensors mounted on farming vehicles, farming implements, and machinery. The farming vehicles and farming implements may include, but are not limited to the following: tractors, planters, balers, drills, harvesters, cultivators, sprayers, pickers, spreaders, mowers, harrows, wind rowers, plows, and any other type of agricultural field equipment. Some examples of sensors that may be mounted on the farming vehicles and farming implements are kinematic and position sensors (for example, speed sensors, accelerometers, gyros, GPS transceivers, etc.), sensors used with tractors or other moving vehicles (for example, fuel consumption sensors, engine speed sensors, hydraulics sensors, etc.), sensors used with seed planting equipment (for example, seed sensors, load sensors, seed planting depth sensors, etc.), sensors used with tillage equipment (for example, downforce sensors, tool position sensors, etc.), sensors used with application and/or spraying equipment (for example, tank fill level sensors, spray valve flow sensors, supply line sensors, etc.), and sensors used with harvesters (for example, weight sensors, grain height sensors, feeder speed sensors, etc.).

Machine data 120 may also include agricultural equipment computer 122 data. The agricultural equipment computer 122 receives and processes data generated by a farming vehicle and farming implement during performance of a farming operation. The agricultural equipment computer 122 extracts operating parameters and global positioning data from the agricultural equipment sensor data 121 data and determines a set of operating events for the farming operation, which can be later used by the precision agricultural system 170. Depending on the type and make of the farming vehicle, it may include more than one agricultural equipment computer 122.

Another form of machine data 120 is data derived from the cab transmission device 123. The cab transmission device 123 is communicatively coupled to the farming vehicle or farming implement to permit receiving engine or machine data, implement data, and variable-rate data, while the vehicle and machine are being used to perform a farming operation. A GPS receiver included on the cab transmission device 123 may permit receipt and processing of satellite signals and data detected by way of an external antenna. The cab transmission device 123 attached to the farming vehicle and/or the farming implement obtains the global positioning data received with the satellite signals. With configuration, the external antenna may receive satellite signals from a variety of different satellite providers, including, but not limited to GLONASS, COMPASS, EGNOS and GPS. The cab transmission device 123 analyzes and translates the geo-data received into valuable geo-position data, such as latitude, longitude, attitude and orbit, altitude, and time data. Furthermore, the cab transmission 123 may receive data from sensors that are directly coupled to the device via input ports and it can be mounted anywhere, for example attached to the roof of a farming vehicle. The cab transmission device 123 may also receive data inputted from the user 140 through the mobile device 150.

Notably, the farming operation data acquired by the cab transmission device 123 attached to the farming vehicle and farming implement, may be transmitted to the precision agricultural system 170 in real-time while the farming vehicle and farming implement are still performing the farming operation. Alternatively, the farming operation data may be collected by the cab transmission device 123, stored in its memory or some other memory storage device for some time, and uploaded to the precision agricultural system 170 later.

In the case where there is no network connection available while the farming vehicle and farming implement are performing a farming operation, all the data that is intended to be transmitted will be stored in an on-board digital memory and managed by buffer. Network connection will be continuously monitored and once a connection is available, all the buffered data is uploaded to the precision agricultural system 170. Furthermore, the data buffering may prioritize the data transmissions so that the more imperative or time-sensitive information may be uploaded to the precision agricultural system 170 in real-time, meanwhile non-critical or information that is not time-sensitive may be uploaded later.

Field data 130 is also another type of data that may be ingested into the precision agricultural system 170. The field data 130 may be derived from weather stations 131, sensor probes 132, soil samples 133, and other remote sensors 134. The most accurate field-level weather information comes from measuring it directly in the field using weather stations 131. These weather stations 131 report temperature, humidity, dew point, wind speed/direction, barometric pressure, and rain, which includes daily and hourly precipitation. Weather stations 131 may be installed at different densities depending on the number of stations in an area. Some regions may require more weather stations 131 to be installed than others, or the user 140 might request more weather stations on specific areas of the field. Another form of field data are sensor probes 132 which may be installed on the field to measure specific characteristics and gather field specific data. For example, a soil moisture probe may be inserted into the soil, at the field, and at different locations. This specific example provides near-real-time data on volumetric soil moisture content, which is converted into percent representing the available water within the crop rooting zone, inches of available water, crop root dynamics, and irrigation requirements. The soil sensor probe may also include multiple sensors that measure soil temperature and other parameters at various depths within the soil. Field data 130 may also include data derived from soil samples 133 taken directly from the field. Soil samples 133 may be analyzed onsite or sent to a remote laboratory for analysis. The soil samples 133 are analyzed for soil properties that may include elemental composition, pH, organic matter, cation exchange capacity, percent base saturation, excess lime, soluble salts, etc. Depending on the field size and properties, it may be beneficial to add remote sensors 134 as part of the field data 130. These remote sensors 134 may be installed or mounted at diverse locations of the field and may include cameras, infrared sensors, near-infrared (NIR) sensors, temperature sensors, humidity sensors, ultrasonic sensors, radar sensors, electromagnetic sensors, ultraviolet sensors, etc. The remote sensors 134 may also be installed on farm structures or buildings, unmanned aerial vehicles (UAV) or "drones," robots, and so on.

In an embodiment, a user 140 (for example, the farmer or anyone associated with the farming business) may ingest data into the precision agricultural system 170 by a mobile device 150, which may be configured by an operating system and one or more application programs. An example of an application program used by the mobile device 150 is FarmCommand™, which is commercially available from Farmers Edge Inc.®, Winnipeg, Manitoba, Canada. The mobile device 150 may also send data to the precision agricultural system 170 independently and automatically under program control without direct interaction from the user 140. Examples of data sent by the mobile device may include, images captured by a built-in camera of the mobile device, GPS data, and manual user inputs. The mobile device 150 may be one or more of the following: a smartphone, PDA, tablet computing device, laptop computer, desktop computer, workstation, or any other computing device capable of transmitting and receiving information and performing the functions described herein. The mobile device 150 may communicate directly to the cab communication device via communication link 160 using a mobile application stored on the mobile device.

(d) Data Storage

Data that is ingested into the precision agricultural system 170 is stored in the data repository 175. As illustrated in FIG. 1, data can be ingested from different sources that may be physically remote from each other, but which are communicatively coupled by the network 165. The network 165 is typically the Internet, but can be any network(s), including but not limited to a LAN, a MAN, a WAN, a mobile wired or wireless network, a private network, a virtual private network, or a combination thereof.

Typically, a data repository 175 is included to store data, that may be in raw data form, as it is received by the precision agricultural system 170. This data may be received from several external sources, such as external data 110 and external data sharing 195. Any data stored in its raw format may be processed and restored into a new format. The external data sources 110 and 195 may be authorized to either push data directly into the database or pull data out of the database. The data could also be machine data 120 received from farming equipment, field data 130 or data received from mobile device 150. Typically, data gets routed into the appropriate data structures inside the agriculture data repository 175.

The data repository 175 includes an application programming interface (API) designed specifically for transferring data from the data sources 110, 120, 130, 150, and 195. Data being stored in the data repository 175 may be tagged to facilitate retrieval at a later date. Several examples of data sources are shown in FIG. 1 and may include real-time, forecast, and/or historical data. For example, the weather feeds 113 may be current weather conditions, past weather data, or forecast weather data.

External data sharing 195 allows the data repository 175 to be configured to receive input from authorized data partnerships 197 using data protection module 196. For example, an agronomy program developed by a third-party may be permitted to export prescription maps into the data repository 175. The data protection module will protect the data in the data repository 175 and only give permissions for authorized data partnerships 197 to access specific data in the data repository 175. Data from authorized data partnerships 197 may be inputted from devices including smartphones, laptops, tablets, and external online servers, all configured to permit specific customers access to and provide input into the agriculture data repository 175 via authorized business and personal accounts on the precision agricultural system 170.

(e) Data Analytics

Data collected in the data repository 175 is processed to derive value and can drive functions such as visualization, reports, decision-making, and other analytics. Functions created may be shared and/or distributed to authorized users and subscribers. Data is collected and stored separately in the data repository 175; however, data must be presented in a meaningful and useful way for the user 140 or data partnerships 197 to derive any value.

Data modeling and analytics 180 may include one or more application programs configured to extract raw data that is stored in the data repository 175 and process this data to achieve the desired function. A report generator is an example of one application program that can query the data repository 175 and collect information that can be transmitted to authorized users or subscribers in the form of a custom report. It will be understood by those skilled in the art that the functions of the application programs, as described herein, may be implemented via plurality of separate programs or program modules configured to communicate and cooperate with one another to achieve the desired functional results. Furthermore, the data may be integrated from more than one source and may be of different types. For example, a recommendation engine is an application program that utilizes zone attributes as well as soil test values, both physical and calculated, to deliver quantities of nutrients to deliver crop growth yield expectations by zone.

Data stored in the data repository 175 may be categorized/tagged with certain attributes to facilitate processing functions. The assignment of these attributes may be a manual or an automated process. Although data may be extracted from different sources, they may be tagged with a common attribute. For example, an application program such as a task generator may be configured to identify all data in the agriculture data repository 175 tagged with the same task ID, which was generated by the agricultural equipment computer 122. Once the data is stored, the task generator searches for data with the common task ID and groups all similar data together to create a single file or record. The electronic record might include operating events spanning over a period, since some tasks need a couple of days to be executed, for example, harvesting a very large field.

In an embodiment, data modeling and analytics 180 may be configured or programmed to preprocess data that is received at the data repository from multiple data sources 110, 120, 130, 150, and 197. The data received at the data repository may be preprocessed with techniques for removing noise and distorting effects, removing unnecessary data that may skew more prevalent data, filtering, data smoothing, data selection, data calibration, and accounting for errors. All these techniques may be applied to improve the overall data set. Yield data should be taken from seasons devoid of major events that may drastically affect the observed values, such as flooding, hail, or insect damage, etc. In another example, post-harvest calibration techniques may be used for correcting data collected from machines with known instrumentation errors that contribute to systematic bias.

(f) Data Visualization

Data visualization 190 may be programmed or configured to generate a graphical user interface (GUI) to be displayed on the precision agricultural system 170, mobile device 150, or to data partnerships 197 via external data sharing 195.

Authorized users or devices may be granted authorization to only view the data stored in the data repository 175 of the precision agricultural system 170, but not the ability to make any changes to it. Data protection module 196 ensures that only authorized users or devices receive reports on the requested data. An API is used to pass a query containing variables through the application, for example, a report generator. Then the application retrieves this information and converts it into a meaningful, visual format that is returned to authorized user(s) or device(s) via data visualization 190.

Other authorized users or devices may be given authorization to both view and/or receive data from and transmit data into the data repository 175. Some examples of a device may include a mobile phone, smartphone, tablet, laptop, or other device with a cellular connection. A device may be used to transmit and receive data to and from the precision agricultural system 170. All devices may be configured to run software optimized to provide visually appealing reports for data visualization 190.

A user may utilize several different devices that have different interfaces or displays. A user may, for example, use a tablet computer, such as an iPad or an Android tablet. A person skilled in the technical field would be aware of many different tools available that render high-resolution color images and reports. Alternately, the user may also request and download reports that are rendered instead on the precision agricultural system 170. In this case, the report generator sends a request for data to the data protection module 196, where the user's credentials and device are first validated. The data repository 175 is then queried and returns the requested data to the report generator, which is finally converted into a format that can be displayed to the user on that specific tablet or computer.

(g) Process Overview—Agronomic Model

In an embodiment, the precision agricultural system 170 is programmed or configured to create an agronomic model. The data modeling and analytics 180 generates one or more preconfigured agronomic models using data provided by one of more of the data sources 110, 120, 130, 150, and 197 that is ingested into the precision agricultural system 170, as well as stored in the data repository 175. The data modeling and analytics 180 may comprise an algorithm or a set of instructions for programming different elements of the precision agricultural system 170. Agronomic models may also be used to for specific applications that work in conjunction with any element of the agricultural architecture 100. Agronomic models may comprise calculated agronomic factors derived from the data sources that can be used to estimate specific agricultural parameters, for example, crop yields, weather data, harvesting parameters, etc. Furthermore, the agronomic models may comprise recommendations based on these agricultural parameters, such as, but not limited to, the following: fertilizing recommendations, irrigating recommendations, harvesting recommendations, and planting recommendations. Additionally, data modeling and analytics 180 may comprise agronomic models specifically created for external data sharing 195 that are of interest to third parties. Some examples of these agronomic models may include the following: return on investment, agricultural equipment information, and weather data for insurance purposes.

In another embodiment, the data modeling and analytics 180 may generate prediction models. The prediction models may comprise one or more mathematical functions and a set of learned weights, coefficients, critical values, or any other similar numerical or categorical parameters that together convert the data into an estimate. These may also be referred to as "calibration equations" for convenience. Depending on the embodiment, every calibration equation may refer to the equation for determining the contribution of one set of data or some other arrangement of equation(s) may be used.

In order to train the model and determine the values for the model parameters (i.e., for the calibration equations), certain data may be collected as inputs for training the model. The type of modeling function may vary by implementation. In one embodiment, regression techniques such as: ElasticNet, linear, logistic, or otherwise may be used. Other techniques may also be used, some examples of which include Random Forest Classifiers, Neural Nets, Support Vector Machines, and so on. Once trained, the resulting prediction model can then be used to predict a specific type of data. To validate that the model is working, the predictions versus the benchmark datasets are validated by taking the test cases and relating them back to the true values of a traditional model. Validation involves relating the predictions of the model to the true values that were collected.

The objective of the present invention is to train a final model to create an estimate for the yield of a crop. Where FIGS. 4 to 8 provide diagrams of the overall workflow for each of the five types of models used in the yield forecasting method using an ingest of data.

Pre-Season and in-Season Yield Prediction Models

Pre-season and In-season yield prediction models share nearly identical processes, where the predominant variance is that they use different available feature sets. That is, Pre-season will have access to only one available feature set, where In-season features will have access to feature datasets for April, May, June, July, August, and September as available each month after planting. Both models use a machine learning weather model described below.

Figure 4:
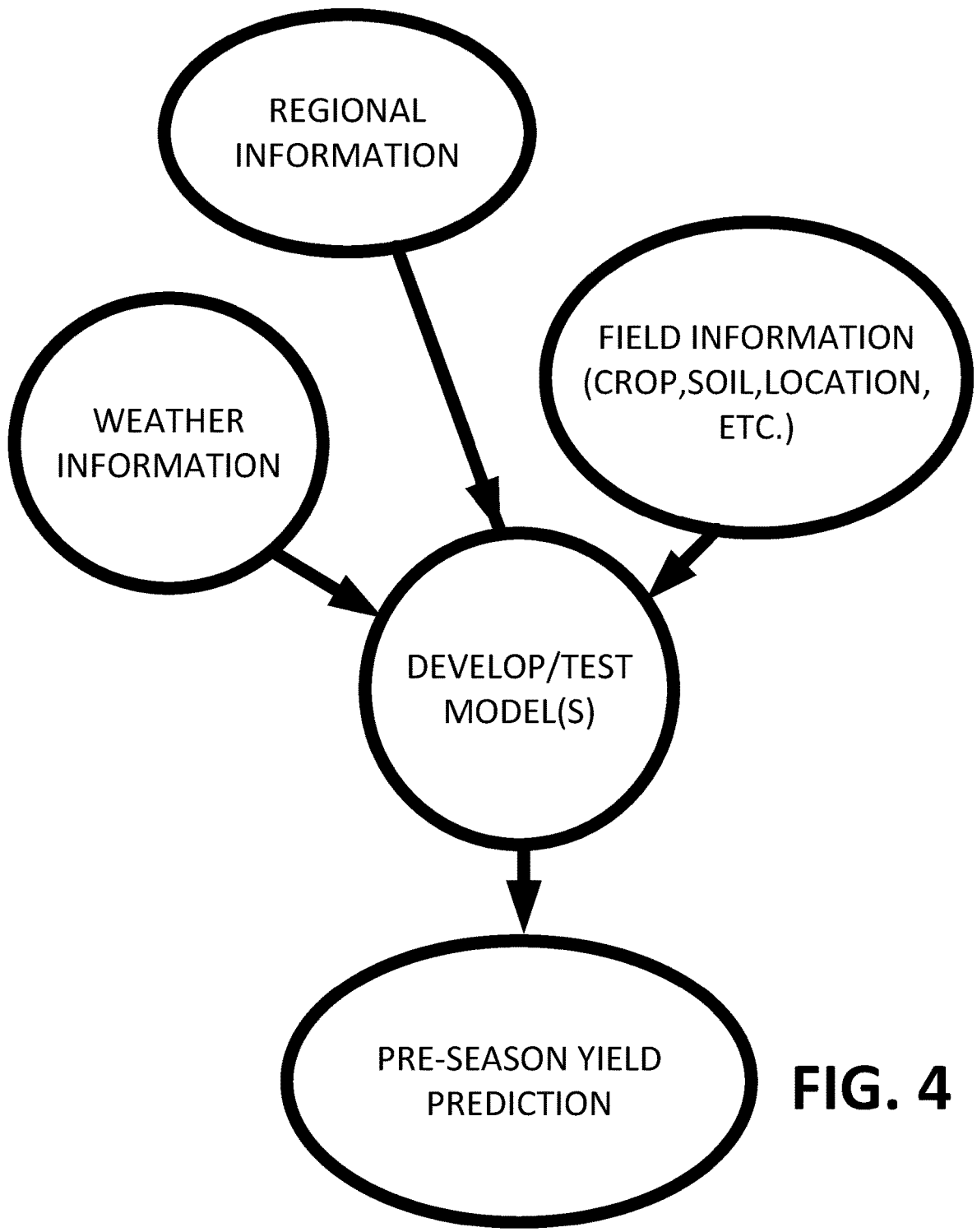
FIG. 4 illustrates an overview of the yield forecasting method using the Pre-season model.
Figure 5:
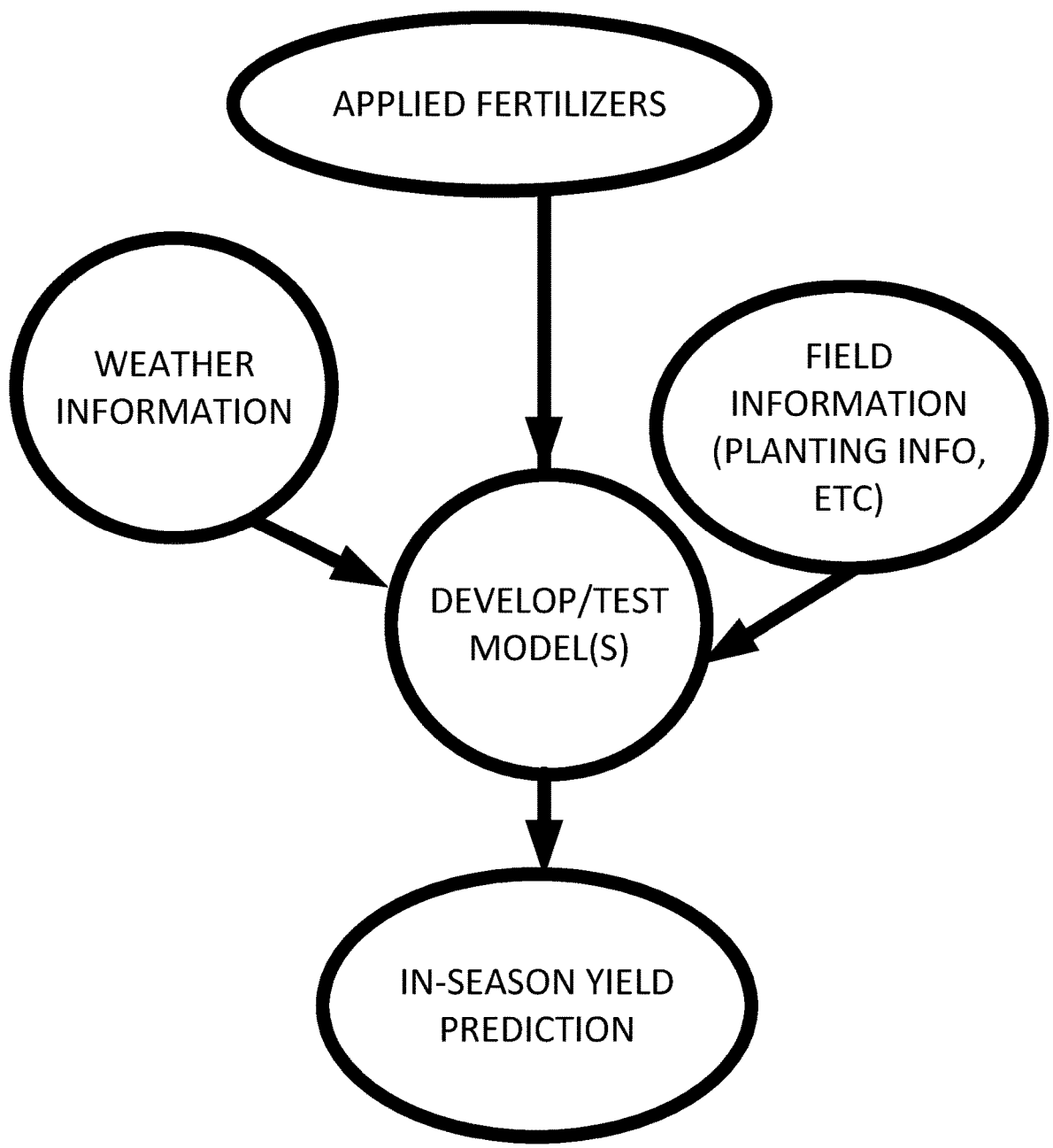
FIG. 5 illustrates an overview of the yield forecasting method using the In-season model.

The Pre-season model predicts a season's crop yield from field and weather data that is not related to the planting of the crop and is illustrated in FIG. 4. For example, soil nitrogen content is used, but the applied nitrogen is not. There are over 200 features that may be used in the model, but only a subset of these features has been selected for their relative importance in building the regression model. The subset features mainly include the following: location (e.g., latitude, longitude, etc.), crop type, regional yields over multi-year spans, soil information (e.g., N, P, K, S, Cu, etc.), field information (e.g., tillage, irrigation, etc.), and weather data which may include regional and local data on monthly or longer time scales. As shown in FIG. 5, the In-season model predicts a season's crop yield from weather and planting data. For example, applied nitrogen at seeding and average mean temperature since seeding. There are over 100 features that may be used in the modeling, but a subset of these features has been selected for their relative importance in building the regression model. The subset features mainly include but are not limited to field information (e.g., planting information, etc.), applied fertilizers, and weather information (e.g., monthly, weekly, etc.). Predictions are made for April 1, May 1, June 1, July 1, and September 1. Each prediction is calculated from all previously available data. For example, the June 1 model uses all available data prior to June 1.

Typically, a data repository is included to store data, and it may be in a raw data format, as it is received before it is ingested into the Pre-season and In-season models. This data may be received from several external sources and meanwhile data stored in its raw format may be processed and re-stored into its new format. Ultimately, data needs to be provisioned to be able to generate the required features that are ingested into these models. Some provisions may include removing spurious and anomalous data and categorical encoding.

In order to train these models and determine the values for each model's parameters, certain data may be collected as inputs for training the model. The type of modeling function may vary by implementation. Once the model is trained, the resulting prediction model can then be used to predict a specific type of data, in this case, a yield prediction.

A recursive feature extraction with cross validation is used as an automated way to select the best features out of all the features provided. Some examples of machine learning techniques that may be used, include XGBoost, scikit-learn's Gradient Boosting Regressor, a Neural Network, and so on. The model is trained via K-fold cross validation. For each fold, the most important features (e.g., measured as the cumulative relative importance up to a threshold) are retained. The trained features are selected as those that were common to all folds.

The maximum tree depth is varied from one through ten. The lowest maximum tree depth within one standard error of mean squared error is selected as the best model.

Statistical Imagery Model

Figure 6:
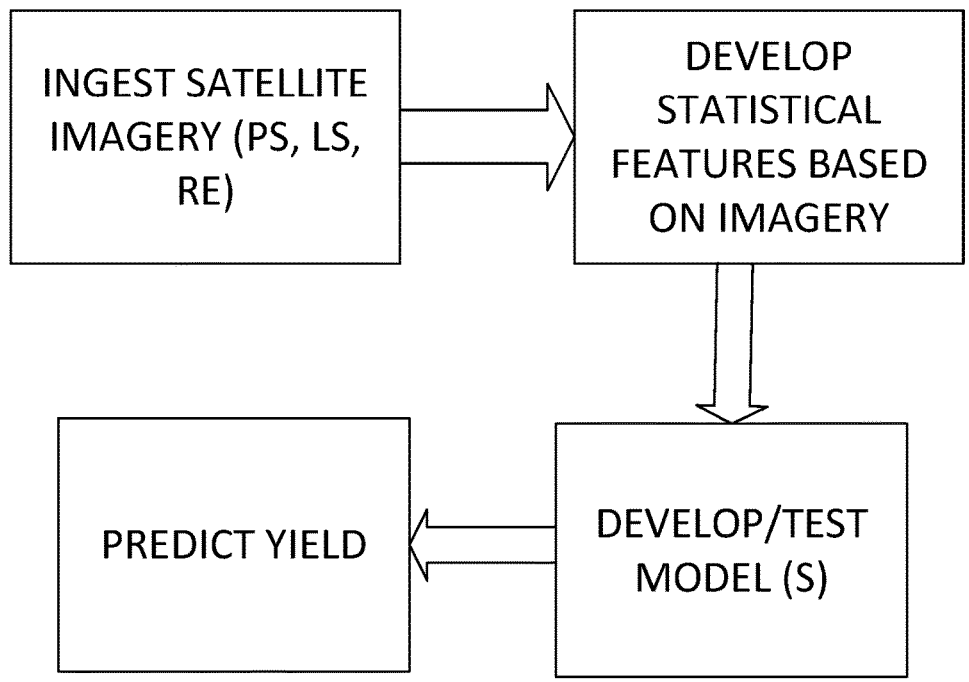
FIG. 6 illustrates an overview of the yield forecasting method using the Statistical Imagery model.

The imagery model uses satellite imagery at a field level to develop statistical descriptions of the field and then attempts to predict the yield based on those statistics. FIG. 6 illustrates an overview of the Statistical Imagery model for crop yield prediction.

Remotely-sensed images from different satellites are gathered. The satellites that were used to obtain imagery data are PlanetScope™ (i.e., 4 bands—R, G, B, NIR), RapidEye™ (i.e., 5 bands—R, G, B, RedEdge, NIR), and LandSat8™ (i.e., 8 bands—focused on R, G, B, NIR, SWIR1, SWIR2). Other satellites may be included using the same methodology. The different bands are extracted and can then be used to create different images through combining the color channels in different ways.

There are two different types of features created; one is the creation of vegetation and related indices, and the second is features based on the relationships of the channels in image format.

The following vegetation and related indices were created: NDVI, NDWI, GDVI, CVI, EVI2, SI, MSR, GCI, OSAVI, GOSAVI, LAI2.

The remaining features include the following: Grayscale, HSV color space, R/G, R/B, GB, G/NIR, B/NIR, SWIR1/NIR, SWIR2/NIR, SWIR1R, SWIR2/R, SWIR1/G, SWIR2/G, SWIR1/B, SWIR2/B, time-based (i.e., seeding, harvest), and location-based, where R=red, G=green, B=blue, NIR=Near Infrared, and SWIR½=Shortwave Infrared channels.

Statistical image values may be derived by calculating the average mean, median, maximum, mean/median, standard deviation, and IQR (i.e., interquartile range—(75%-25%)) for the channels and indices above. These calculations yield over 200 total features. Therefore, a feature selection process needs to be applied.

Two methods of feature selection are used. The first is feature ranking with recursive feature elimination and cross-validated selection (RFECV) that uses cross-validation methods in order to select the best features to train the model. The second technique uses a built-in feature importance list that is generated during training. These features lists are pared down until the optimum number of features are selected.

Approximately 40 to 50 features, from the greater than 200 features, are selected for each month (May, June, July, August, and September) for the built models. These features have a similar core set, but the periphery set differs month-to-month to provide a better yield prediction.

In order to train the models, there are several necessary steps.

All the data is retrieved from the image repository through a data pipeline. This contains all the useful images, which are spread over time for the same spatial grid (e.g., field). The "raw" data is then aggregated into a new temporal resolution (currently about four to seven days) that helps to reduce noise (e.g., clouds and shadow) in the images. The aggregated images are then subjected to feature engineering and then feature selection, as described above.

The data (i.e., temporal statistical data) is then used to develop models. The process that may be used for testing, making it comparable across all model development, is to create a K-fold cross validated prediction set when grouped by farm. The K-folds try and split the data evenly between the K-folds when trying to train for each cross-validation fold.

The model predictions are tracked by several metrics, including Mean Absolute Percent Error (MAPE), Median Absolute Percent Error (Median APE), r2 score, and standard deviation of the residuals. The "best" model(s) is/are selected for training the model on the entire set.

To train the best model(s), it is beneficial to use the entire dataset. The imagery model may use eXtreme Gradient Boosting models (XGBoost) or a neural network to provide the best possible results for prediction. Predictions are then made by the trained model. These are the predictions that would provide the information to the user based on available imagery data. Once the predictions are made on the aggregated temporal data, they are aggregated to monthly predictions or it can be done in another manner that is best suited for the user.

Histogram-Based Image Model

Figure 7:
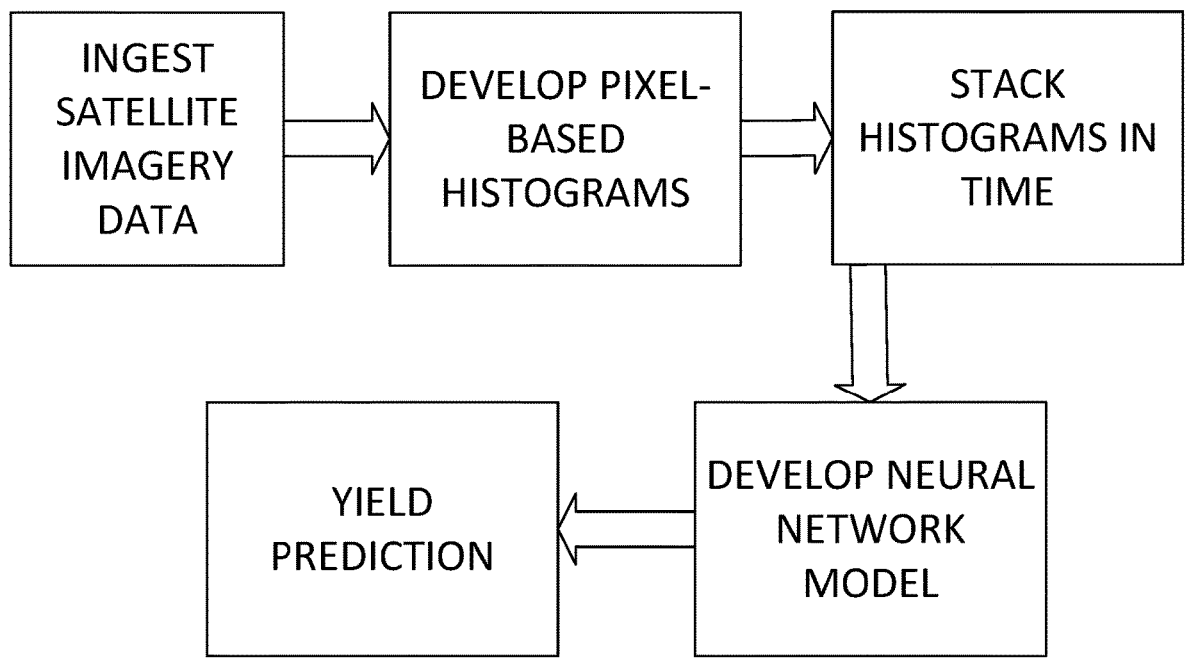
FIG. 7 illustrates an overview of the yield forecasting method using the Histogram-Based Image model.

As shown in FIG. 7, the Histogram-Based Image Model uses satellite imagery and converts the images into histograms containing pixel information, which are then stacked into a time-channel. The Histogram-Based Image model is developed on this temporal information to predict an estimate of the crop yield.

Similar to the Statistical Image model, remotely-sensed images from different satellites are gathered. The satellites that were used to obtain imagery data may include: PlanetScope™ (4 bands—R, G, B, NIR), RapidEye™ (5 bands—R, G, B, RedEdge, NIR), and LandSat8™ (8 bands—focused on R, G, B, NIR, SWIR1, SWIR2). However, other satellites may be included using the same methodology. The different bands are extracted and can then be used to create different images through combining the color channels in different ways.

Satellite imagery data is gathered over the growing season (e.g., for North America it typically is April $1^{st}$ to September $1^{st}$). This ingest of imagery data is needed and used to train the Histogram-Based Image model. The images are first converted into histograms depending on the type of satellite. For example, PlanetScope™ images have four channels: blue (B), green (G), red (R), and near infrared (NIR), and the pixel values range from 0 to 10000. The pixel values are rescaled, and for any abnormal values, which are too small (area that is too dark) or too big (area that is too bright), are cut-off. However, it is important to note that each channel has different cut-off edges to define a normal value range. In our example, we use 14~46 in both B and G channels, 8~40 in R channel, and 10~136 in NIR channel. The scaled and cut pixel values are placed into a histogram with 32 bins in which a 32-dimensional vector is derived for each channel of the image. This results in an image that has been converted into a 32*4 matrix.

A temporal image set over the growing season can provide a more valuable and accurate representation of the final crop yield rather than a single image; to achieve this, it is necessary to aggregate all 32*4 matrices of all the images of a field within a growing season into one single representation.

The growing season in North America is typically from April 1st to September 1st; however, this model may be modified depending on the geographic region it is applied on. There are approximately 155 days in this growing season that are evenly split it into 26 time-steps, resulting in approximately six days per time-step. All image information (i.e., the 32*4 matrix) within the same time-step will be simply summed together and normalized into 0~1.

After the aggregation, a 32*4 matrix remains for each of the 26 time-steps of a field. The matrices are then simply stacked based on the time-step order resulting in a 32*26*4 representation that contains all images information over the season of the field.

Although images over a growing season are needed for a more accurate yield prediction, if there is no image available in a time-step, all histograms would be zeros. The Histogram-Based Image model has the ability to make yield predictions mid-season. The proposed 32*26*4 representation accepts missing information in some time-steps. For instance, if a representation for a field with images up to July $1^{st}$ is constructed, the representation would include all zeros after July $1^{st}$. Since there is some missing information in this case, a less accurate prediction is expected in mid-season, and especially early season.

The Histogram-Based Image model uses a deep convolutional neural network (CNN) for the supervised learning. The use of deep convolutional neural networks is known to a person skilled in the art of machine learning, however, necessary modifications in model structure, time step setting, cutoff edges, etc., are needed to adapt to this model's dataset. The CNN is trained using a dataset, consisting of thousands of satellite images, that is stored on a cloud storage network. All the data pre-processing (i.e., from raw image to histogram representation) is performed on the cloud. These satellite images contain pixels that represent a field. During the training phase, the network learns the relationship between image representations of the field and crop yield. After the network is trained, information is uploaded into a server and used to detect pixels in query images. These queries might be sent from components to provide yield prediction.

A K-fold cross validation is performed over the dataset for a certain number of fields, wherein in each fold the model will not see data from the same farm in the test set, therefore, avoiding information leakage. The model accuracy is evaluated using metrics such as Mean Absolute Percentage Error (MAPE) and median absolute percentage error (MedianAPE).

Crop Specific Models

Figure 8:
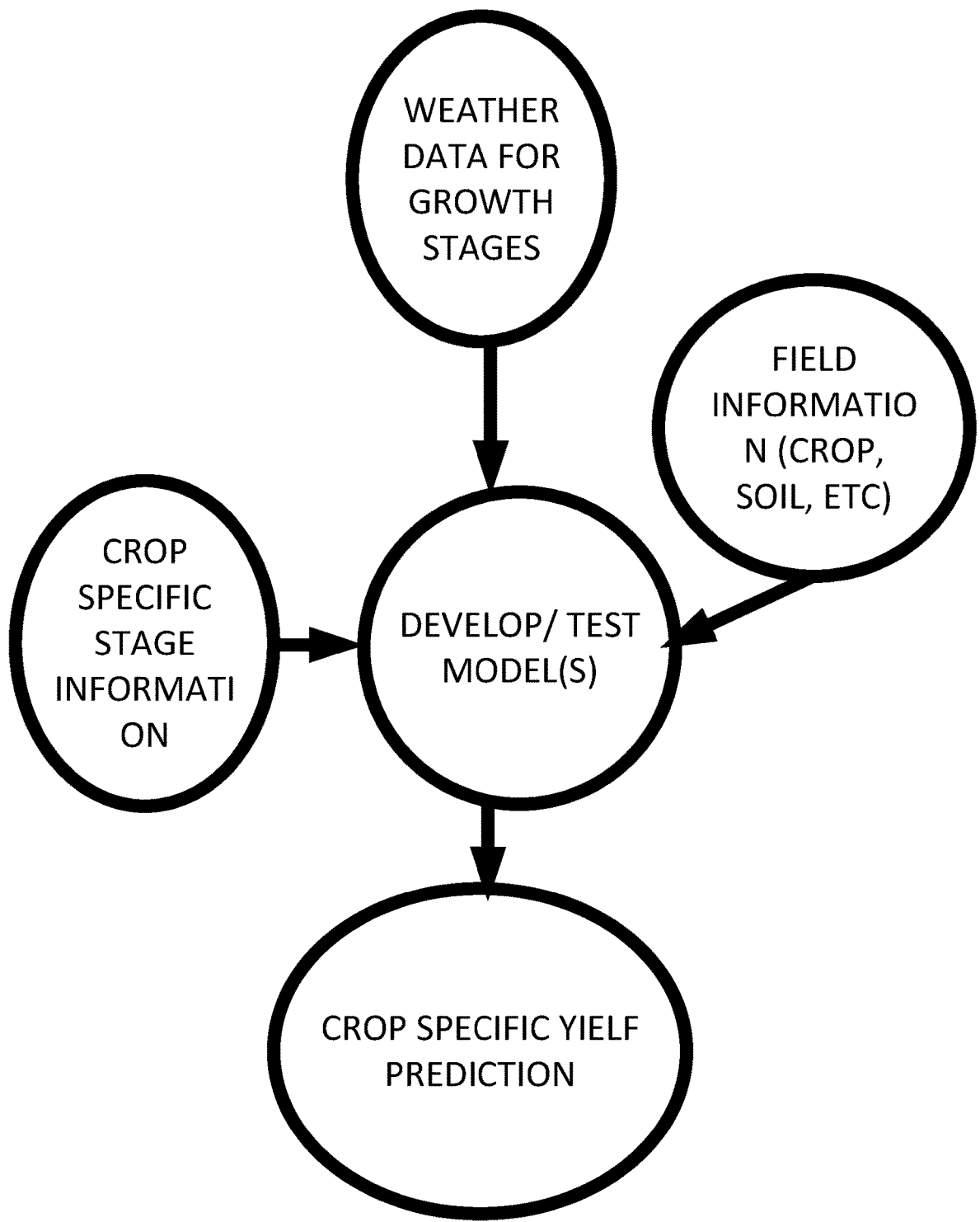
FIG. 8 illustrates an overview of the yield forecasting method using the Crop-Specific models.

FIG. 8 illustrates a generalized model that can be applied to all crop-specific models. The crop-specific models use features derived from the growth stages of the specific plants after seeding. The features include weather during growth stages, soil conditions, and crop-specific information. The crop specific model is not limited to only one crop model and it may include a number of crop-specific models. For example, five crop-specific models are described: (1) wheat, (2) canola, (3) corn, (4) lentils, and (5) soybeans, all using similar features.

Figure 9:
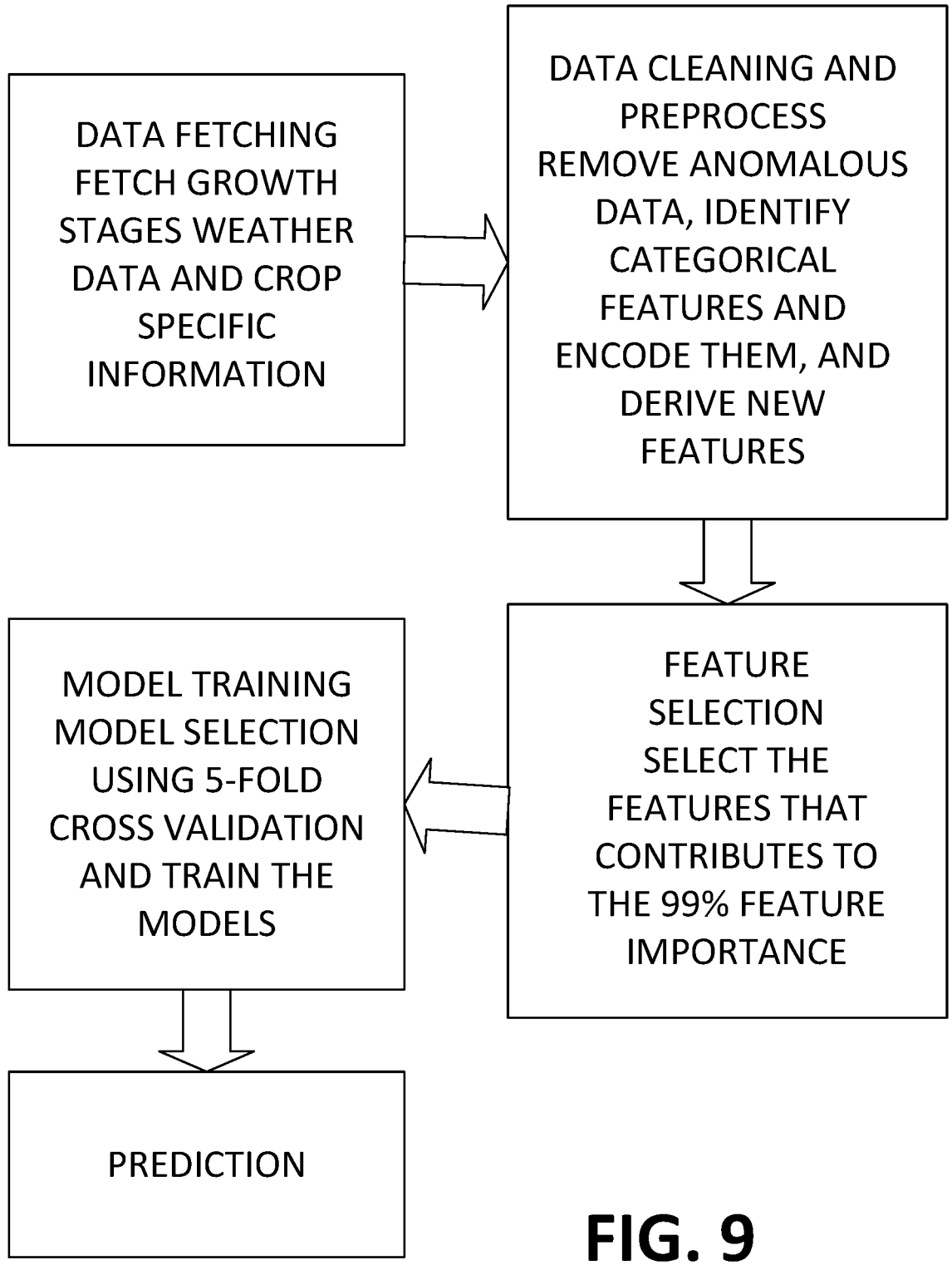
FIG. 9 illustrates a process flowchart of training the Crop Specific Models for crop yield predictions.

FIG. 9 illustrates a process of training the crop specific models for crop yield predictions.

During specific growth stages of the crops, crop-specific information, weather data, and soil characteristics are retrieved to ingest into the crop-specific models. Data may be retrieved from storage or from a server using an operating system or one or more application programs or systems. An example of an application program used is FarmCommand™ which is commercially available from Farmers Edge Inc.®, Winnipeg, Alberta, Canada. FarmCommand™ features computer software platforms for cloud-based services in the field of agriculture. Furthermore, data may be procured from external sources, which may also be publicly available databases. Stored data may be tagged with several attributes such as, but not limited to a start date, end date, latitude, longitude, and an optional period (for example, daily, monthly, etc.). Growth stages are different depending on the type of crop. For crop-specific models, the growth stages are grouped into different bins to deal with any overlaps between the growth stages and to reduce the number of different growth stages. The weather data during specific growth stages of the crops may include precipitation, temperatures, solar radiation, wind, relative humidity, etc. The crop information may include variety, previous crops, and seeding date, etc.

Before any data can be used, it needs to be cleaned and pre-processed, wherein anomalous data is removed. Observations with a null average yield or very low average yield are removed from the dataset. Also, any column with significant missing data is dropped. Categorical features are identified from the crop specific dataset and are encoded appropriately. Furthermore, the date of the year (DoY) of the seeding date is used as a feature for crop specific models.

After the data has been pre-processed, then the features are selected. The number of features vary for each month, particularly since weather data is specific to the respective growth stages considered for each crop. For selecting the best features, a built-in key feature list is used, that is generated by the model during training employing a K-fold cross-validation method. The mean of the key feature of importance is taken from the K-fold cross-validation and then the features that added up to 99% of the total importance are selected.

After the selected features are produced for the models, a K-fold cross-validation is performed to select the models for each crop. The accuracy of the models is evaluated using the Mean Absolute Error (MAE), Mean Absolute Percentage Error (MAPE) and Median Absolute Percentage Error (MedianAPE). The best-tested models are used for training the crop-specific models.

For each variety of crop (for example, Canola, Wheat, Corn, Lentil, and Soybean), the average yields are predicted for each month. Depending on the geographic region, the months for which the yields are predicted may vary (for example, in North America, the months of April to September are of interest). The model for each month for a specific crop is trained on the entire dataset, including data up to and including that month. Machine learning techniques, for example, eXtreme Gradient Boosting (XGBoost), are used for each crop to predict average yield for a specific field.

Once the model is trained for each month, these models can then be used to predict the average yield for a crop. Based on the available data, the prediction for the current month and upcoming months for a specific crop may be determined.

Final Crop Yield Prediction Model

Once each of the five models has provided a prediction for the crop yield, the predictions will be ensembled or stacked together to generate a final crop yield prediction. This methodology is used in machine learning to correct overfitting and bias within a single model. Ensembling can be a simple average mean of all the predictions for example, while stacking uses the results of the predictions as features in a new model—a "second layer" prediction. FIG. 3 illustrates an overview of the final yield forecasting model 300 used by the yield forecasting method. Ensembling is used to help improve machine learning results by combining several models. This approach allows the production of better predictive performance compared to a single model and helps prevent overfitting. Each of the five models may employ different techniques that utilize different features to generate their respective sub-predictions. For example, one model may be a convolutional neural network, another model may be a deep learning algorithm, while another model may be a multi-layer predictor.

Ensembling of the model can take place in other ways. For example, the non-imagery-based models can be combined either through ensembling or through combining the training of the data into a different model, which can be stacked or ensembled with the other models. This combined model can be a neural network or other deep learning algorithm, tree-based algorithm, or other machine learning method. This combined model can then be ensembled with the imagery models to create a final prediction or used separately as required.

Once the final crop yield prediction model is trained, the resulting prediction model can then be used to predict the crop yield prediction in a specific field. Once the crop yield prediction has been determined, this information may be sent to growers or third-party entities automatically or upon request. The generated crop yield prediction can be handed off to a separate data management platform where it is issued to the user.

III. Computing Machine Architecture

Figure 10:
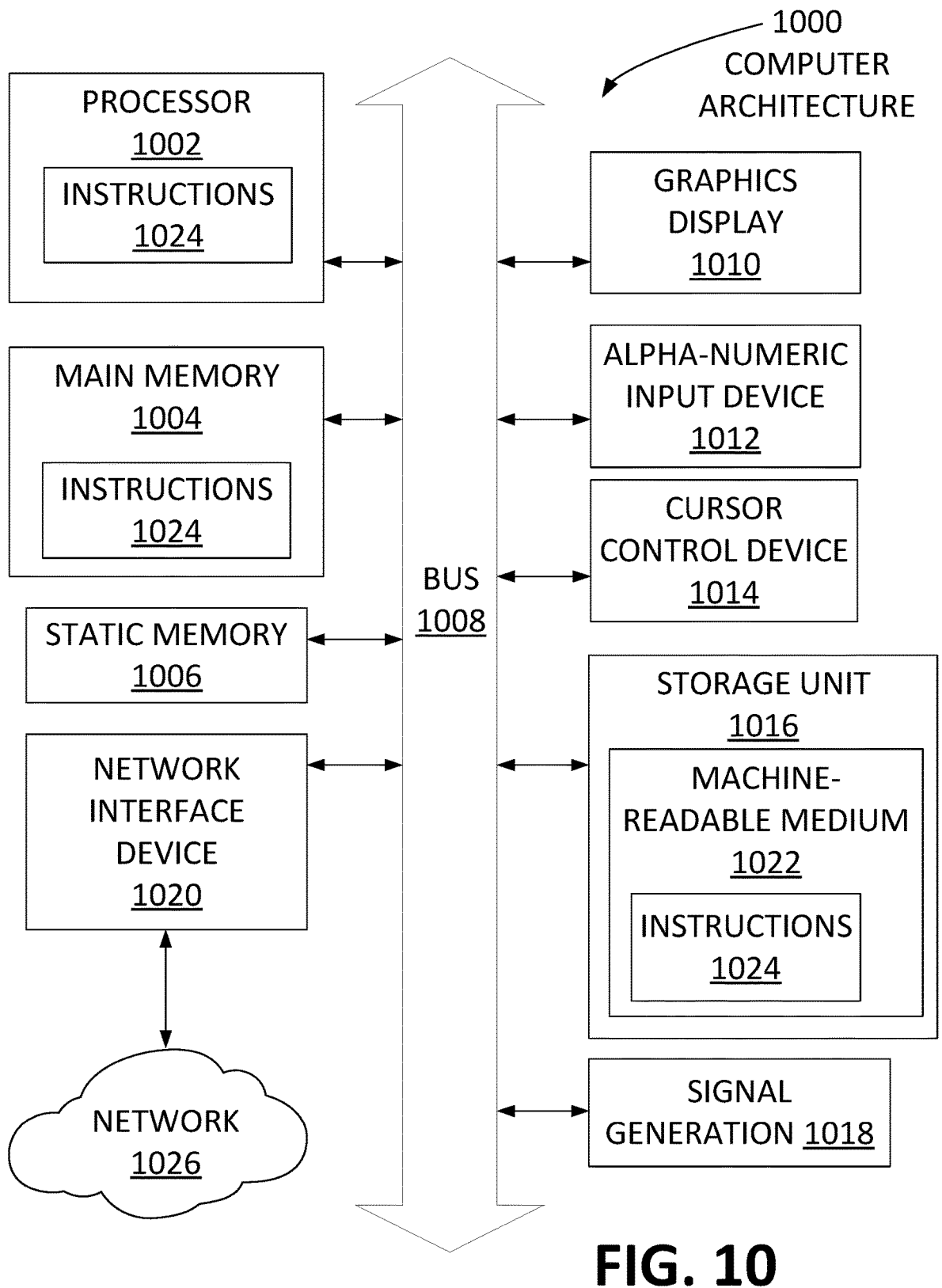
FIG. 10 is a block diagram illustrating components of an example machine able to read instructions from a machine-readable medium and execute them in a processor (or controller).

FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000 within which program code (e.g., software) for causing the machine to perform any one or more of the methodologies discussed herein may be executed. The program code may be comprised of instructions 1024 executable by one or more processors 1002. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), (or any combination of these), a main memory 1004, and a static memory 1006, which are configured to communicate with each other via a bus 1008. The computer system 900 may further include visual display interface 1010. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion, the visual interface may be described as a screen. The visual interface 1010 may include or may interface with a touch enabled screen. The computer system 1000 may also include alphanumeric input device 1012 (e.g., a keyboard or touch screen keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000. The main memory 1004 and the processor 1002 also constitute machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but is not be limited to, data repositories in the form of solid-state memories, optical media, and magnetic media.

IV. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for systems, methods, and apparatus for crop yield prediction through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the disclosure.

What is claimed is:

1. A computer-implemented method for predicting crop yield for a crop growing in an agricultural field, the method comprising:
   applying a pre-season model to provide a pre-season model crop yield prediction to a computing system, wherein the pre-season model uses features selected from field and weather data acquired prior to planting of the crop as pre-season model parameters;
   applying an in-season model to provide an in-season model crop yield prediction to the computing system using features selected from field and weather data acquired after planting of the crop as in-season model parameters;
   applying a statistical imagery model to provide a statistical imagery model crop yield prediction to the computing system using features selected from statistical image values computed from remotely sensed image data;
   applying a histogram-based image model to provide a histogram-based image model crop yield prediction to the computing system, the histogram-based image model configured to use remotely sensed image data;
   applying at least one crop-specific model to provide a at least one crop-specific model crop yield prediction to the computing system using crop-specific information, weather data, and soil characteristics;
   combining at the computing system a plurality of yield predictions from a set comprising the pre-season model crop yield prediction, the in-season model crop yield prediction, the statistical imagery model crop yield prediction, the histogram-based image model crop yield prediction, and the at least one crop specific model prediction to generate a final crop yield prediction.

2. The method of claim 1 wherein the combining is performed by ensembling the plurality of yield predictions to generate the final crop yield prediction.

3. The method of claim 1 wherein the combining is performed by stacking the plurality of yield predictions to generate the final crop yield prediction.

4. The method of claim 1 wherein at least one of the pre-season model, the in-season model, the statistical imagery model, the histogram-based image model, and the at least one crop specific model use a convolutional neural network.

5. The method of claim 1 wherein at least one of the pre-season model, the in-season model, the statistical imagery model, the histogram-based image model, and the at least one crop specific model use a multi-layer predictor.

6. The method of claim 1 wherein the combining at the computing system is performed using a final crop yield prediction model.

7. The method of claim 1 further comprising communicating the final crop yield prediction to a data management platform configured to communicate the final crop yield prediction to a device associated with a user.

8. The method of claim 1 wherein the plurality of yield predictions include the pre-season model crop yield prediction, the in-season model crop yield prediction, the statistical imagery model crop yield prediction, the histogram-based image model crop yield prediction, and the at least one crop-specific model crop yield prediction.

9. The method of claim 1 wherein the plurality of yield predictions include (1) at least one non-image based model selected from a first subset comprising the pre-season model crop yield prediction, the in-season crop yield prediction, and the at least one crop-specific model crop yield prediction, and (2) at least one image based model selected from a second subset comprising the statistical imagery model crop yield prediction and the histogram-based image model crop yield prediction.

10. An apparatus comprising:
    a computing system comprising at least one processor and at least one memory operatively coupled to the at least one processor;
    wherein the memory stores instructions to perform steps to:
      apply a pre-season model to provide a pre-season model crop yield prediction, wherein the pre-season model uses features selected from field and weather data acquired prior to planting of the crop as pre-season model parameters;
      apply an in-season model to provide an in-season model crop yield prediction using features selected from field and weather data acquired after planting of the crop as in-season model parameters;
      apply a statistical imagery model to provide a statistical imagery model crop yield prediction using features selected from statistical image values computed from remotely sensed image data;

apply a histogram-based image model to provide a histogram-based image model crop yield prediction, the histogram-based image model configured to use remotely sensed image data;

apply at least one crop-specific model to provide a at least one crop-specific model crop yield prediction using crop-specific information, weather data, and soil characteristics;

combine a plurality of yield predictions from a set comprising the pre-season model crop yield prediction, the in-season model crop yield prediction, the statistical imagery model crop yield prediction, the histogram-based image model crop yield prediction, and the at least one crop specific model prediction to generate a final crop yield prediction.

11. The apparatus of claim 10 wherein to combine the plurality of yield predictions the plurality of yield predictions are ensembled.

12. The apparatus of claim 10 wherein to combine the plurality of yield predictions the plurality of yield predictions are stacked.

13. The apparatus of claim 10 wherein at least one of the pre-season model, the in-season model, the statistical imagery model, the histogram-based image model, and the at least one crop specific model use a convolutional neural network.

14. The apparatus of claim 10 wherein at least one of the pre-season model, the in-season model, the statistical imagery model, the histogram-based image model, and the at least one crop specific models use a multi-layer predictor.

15. The apparatus of claim 10 wherein to combine the plurality of yield predictions a final crop yield prediction model is used.

16. The apparatus of claim 10 further comprising communicating the final crop yield prediction to a data management platform configured to communicate the final crop yield prediction to a device associated with a user.

17. The apparatus of claim 10 wherein the plurality of yield predictions include the pre-season model crop yield prediction, the in-season model crop yield prediction, the statistical imagery model crop yield prediction, the histogram-based image model crop yield prediction, and the at least one crop-specific model crop yield prediction.

18. A computer-implemented method for predicting crop yield for a crop growing in an agricultural field, the method comprising:

combining at a computing system applying a final crop yield prediction model using a plurality of yield predictions, wherein the plurality of yield predictions include (1) at least one non-image based model selected from a first subset comprising a pre-season model crop yield prediction, an in-season crop yield prediction, and at least one crop-specific model crop yield prediction, and (2) at least one image based model selected from a second subset comprising a statistical imagery model crop yield prediction and a histogram-based image model crop yield prediction;

wherein the pre-season model provides a pre-season model crop yield prediction to a computing system, wherein the pre-season model uses features selected from field and weather data acquired prior to planting of the crop as pre-season model parameters;

wherein the in-season model provides an in-season model crop yield prediction to the computing system using features selected from field and weather data acquired after planting of the crop as in-season model parameters;

wherein the statistical imagery model provides a statistical imagery model crop yield prediction to the computing system using features selected from statistical image values computed from remotely sensed image data;

wherein the histogram-based image model provides a histogram-based image model crop yield prediction to the computing system, the histogram-based image model configured to use remotely sensed image data;

wherein the crop-specific model provide at least one crop-specific model crop yield prediction to the computing system using crop-specific information, weather data, and soil characteristics.

19. The method of claim 18 further comprising communicating the final crop yield prediction to a data management platform configured to communicate the final crop yield prediction to a device associated with a user.

20. The method of claim 19 wherein the combining is performed using at least one of ensembling and stacking.

* * * * *